US009443323B2

(12) United States Patent
Sato

(10) Patent No.: US 9,443,323 B2
(45) Date of Patent: Sep. 13, 2016

(54) IMAGE PROCESSING APPARATUS, IMAGE PROCESSING METHOD AND RECORDING MEDIUM

(71) Applicant: CASIO COMPUTER CO., LTD., Shibuya-ku, Tokyo (JP)

(72) Inventor: Takeshi Sato, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 59 days.

(21) Appl. No.: 14/486,771

(22) Filed: Sep. 15, 2014

(65) Prior Publication Data

US 2015/0086119 A1    Mar. 26, 2015

(30) Foreign Application Priority Data

Sep. 20, 2013 (JP) .................................. 2013-195123

(51) Int. Cl.
| | |
|---|---|
| *G06K 9/46* | (2006.01) |
| *G06T 7/40* | (2006.01) |
| *G06K 9/00* | (2006.01) |
| *G06T 5/00* | (2006.01) |

(52) U.S. Cl.
CPC ............ *G06T 7/408* (2013.01); *G06K 9/00228* (2013.01); *G06K 9/00234* (2013.01); *G06T 5/008* (2013.01); *G06T 2207/10024* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 6,975,759 | B2 * | 12/2005 | Lin ........................ | H04N 9/735 348/E9.052 |
| 7,634,106 | B2 * | 12/2009 | Mino ................... | G06K 9/00228 382/103 |
| 7,945,113 | B2 * | 5/2011 | Hayaishi ............ | G06K 9/00234 382/167 |
| 8,160,310 | B2 * | 4/2012 | Takayama ............ | H04N 1/6077 382/118 |
| 8,295,645 | B2 | 10/2012 | Shimodaira | |

(Continued)

FOREIGN PATENT DOCUMENTS

| | | |
|---|---|---|
| JP | 08107512 A | 4/1996 |
| JP | 2006121416 A | 5/2006 |

(Continued)

OTHER PUBLICATIONS

Computer English Translation of Japanes Patent No. JP 2008-234342, 2008, pp. 1-8.*

(Continued)

*Primary Examiner* — Daniel Mariam
(74) *Attorney, Agent, or Firm* — Holtz, Holtz & Volek PC

(57) ABSTRACT

An image processing apparatus includes: an obtaining member to obtain an image; a copying member to copy the image obtained by the obtaining member; a detecting member to detect a face area from the copied image or the obtained image; a correcting member to perform correction to adjust a brightness and a color shade of a whole of the obtained or copied image from which the face area is detected by the detecting member so that a flesh color component of the face area detected by the detecting member is corrected to become a predetermined status; and a synthesizing member to make a transparency of the face area detected by the detecting member different from another area and to synthesize the image corrected by the correcting member and the obtained or copied image from which the face are is not detected by the detecting member.

8 Claims, 7 Drawing Sheets

(56) References Cited

U.S. PATENT DOCUMENTS

| | | | |
|---|---|---|---|
| 8,379,958 B2 | 2/2013 | Kaku | |
| 8,441,544 B2* | 5/2013 | Minagawa | H04N 5/232 348/222.1 |
| 8,687,847 B2* | 4/2014 | Hattori | H04N 5/147 382/103 |
| 2006/0061598 A1* | 3/2006 | Mino | G06K 9/00228 345/629 |
| 2006/0062435 A1* | 3/2006 | Yonaha | G06T 11/60 382/118 |
| 2010/0119174 A1* | 5/2010 | Shingai | H04N 1/00336 382/275 |
| 2010/0290714 A1* | 11/2010 | Toyoda | H04N 1/4072 382/264 |

FOREIGN PATENT DOCUMENTS

| | | |
|---|---|---|
| JP | 2008131542 A | 6/2008 |
| JP | 2008234342 A | 10/2008 |
| JP | 2010079780 A | 4/2010 |

OTHER PUBLICATIONS

Japanese Office Action (and English translation thereof) dated Sep. 1, 2015, issued in counterpart Japanese Application No. 2013-195123.

Japanese Office Action (and English translation thereof) dated Feb. 9, 2016, issued in counterpart Japanese Application No. 2013-195123.

* cited by examiner

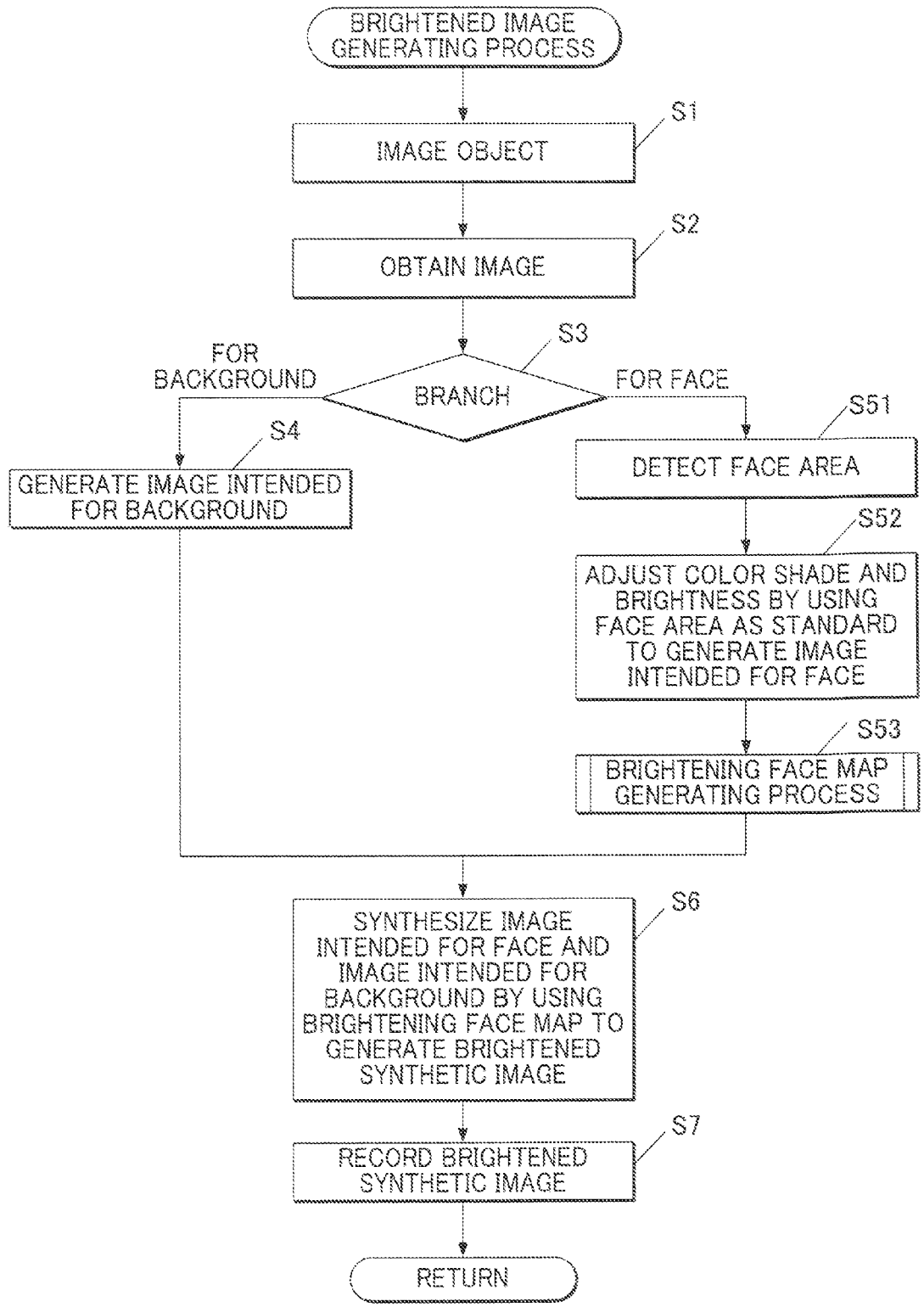

IMAGE PROCESSING APPARATUS, IMAGE PROCESSING METHOD AND RECORDING MEDIUM

CROSS-REFERENCE TO RELATED APPLICATIONS

This application is based upon and claims the benefit of priority from the prior Japanese Patent Application No. 2013-195123 filed on Sep. 20, 2013, the entire contents of which are incorporated herein by reference.

BACKGROUND OF THE INVENTION

1. Field of the Invention

The present invention relates to an image processing apparatus, an image processing method and a recording medium.

2. Description of the Related Art

Heretofore, as described in Japanese Patent Application Laid-Open Publication No. 2006-121416, there has been known a technique to perform, for the purpose of printing, a brightening process to a portrait image to make a human face brighter. This technique uses a brightening lookup table to perform gradation conversion so that a luminance range corresponding to a flesh color area becomes brighter.

SUMMARY OF THE INVENTION

According to the first aspect of the present invention, there is provided an image processing apparatus including: an obtaining member to obtain an image; a copying member to copy the image obtained by the obtaining member; a detecting member to detect a face area from the image copied by the copying member or the image obtained by the obtaining member; a correcting member to perform correction to adjust a brightness and a color shade of a whole of the obtained or copied image from which the face area is detected by the detecting member so that a flesh color component of the face area detected by the detecting member is corrected to become a predetermined status; and a synthesizing member to make a transparency of the face area detected by the detecting member different from another area and to synthesize the image corrected by the correcting member and the obtained or copied image from which the face area is not detected by the detecting member.

According to the second aspect of the present invention, there is provided an image processing method using an image processing apparatus, the method including the steps of: an obtaining step to obtain an image; a copying step to copy the image obtained by the obtaining step; a detecting step to detect a face area from the image copied by the copying step of the image obtained by the obtaining step; a correcting step to perform correction to adjust a brightness and a color shade of a whole of the obtained or copied image from which the face area is detected by the detecting member so that a flesh color component of the face area detected by the detecting step is corrected to become a predetermined status; and a synthesizing step to make a transparency of the face area detected by the detecting step different from another area and to synthesize the image corrected by the correcting step and the obtained or copied image from which the face are is not detected by the detecting member.

According to the third aspect of the present invention, there is provided a computer readable recording medium recording a program for causing a computer of an image processing apparatus to functions as: an obtaining member to obtain an image; a copying member to copy the image obtained by the obtaining member; a detecting member to detect a face area from the image copied by the copying member or the image obtained by the obtaining member; a correcting member to perform correction to adjust a brightness and a color shade of a whole of the obtained or copied image from which the face area is detected by the detecting member so that a flesh color component of the face area detected by the detecting member is corrected to become a predetermined status; and a synthesizing member to make a transparency of the face area detected by the detecting member different from another area and to synthesize the image corrected by the correcting member and the obtained or copied image from which the face area is not detected by the detecting member.

BRIEF DESCRIPTION OF THE SEVERAL VIEWS OF THE DRAWINGS

The above and further objects, features and advantages of the present invention will be made clearer by the following detailed description and the attached drawings, in which:

FIG. 2 is a flowchart illustrating an example of an operation of a brightened image generating process by the imaging apparatus illustrated in FIG. 1;

DETAILED DESCRIPTION OF THE PREFERRED EMBODIMENTS

Hereinafter specific embodiments of the present invention will be described with reference to the drawings. In this regard, however, the scope of the invention is not limited to the illustrated examples.

Figure 1:
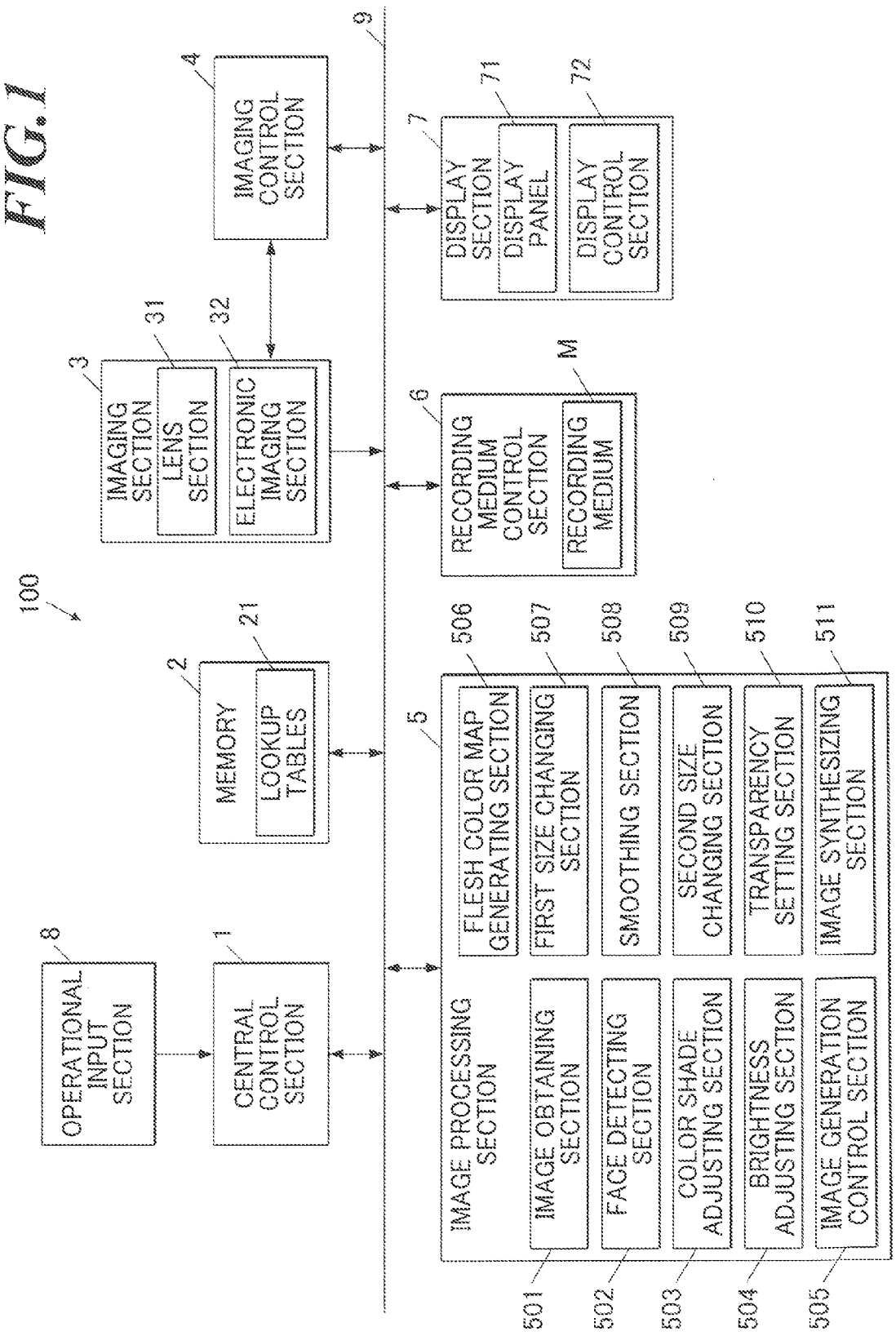
FIG. 1 is a block diagram illustrating a schematic configuration of an imaging apparatus according to one embodiment to which the present invention is applied.

FIG. 1 is a block diagram illustrating a schematic configuration of an imaging apparatus 100 according to one embodiment to which the present invention is applied.

Specifically, as illustrated in FIG. 1, the imaging apparatus 100 of the embodiment includes a central control section 1, a memory 2, an imaging section 3, an imaging control section 4, an image processing section 5, a recording medium control section 6, a display section 7 and an operational input section 8.

The central control section 1, memory 2, imaging section 3, imaging control section 4, image processing section 5, recording medium control section 6 and display section 7 are connected to one another via a bus line 9.

The central control section 1 controls the respective sections of the imaging apparatus 100. Specifically, though illustration is omitted, the central control section 1 is equipped with a Central Processing Unit (CPU), etc., and performs various kinds of control operations according to various processing programs (not illustrated) used for the imaging apparatus 100.

The memory 2 is composed of, for example, a Dynamic Random Access Memory (DRAM), etc., and temporarily stores data to be processed by the central control section 1, the imaging section 3, the image processing section 5, and so on.

The memory 2 also stores various lookup tables (LUTs) 21 to be used in image color conversion and/or image luminance conversion in a later-described color adjusting process by the image processing section 5.

Figure 3A:
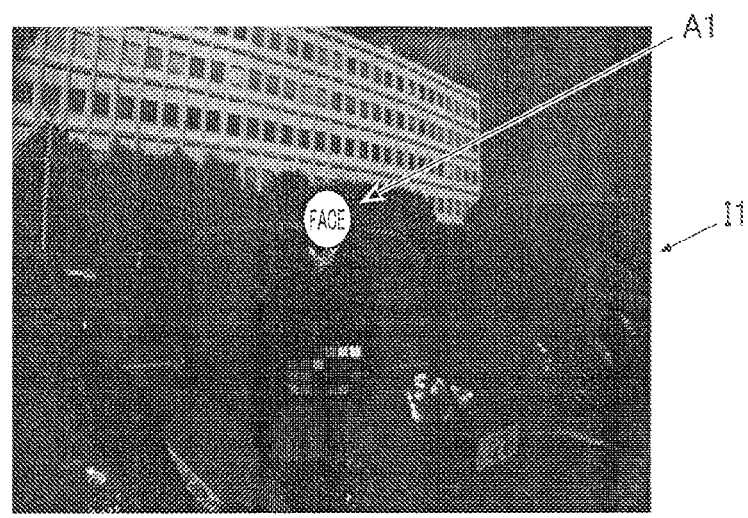
FIG. 3A is a diagram schematically illustrating an example of an image pertaining to the brightened image generating process illustrated in FIG. 2.
Figure 3B:
FIG. 3B is a diagram schematically illustrating an example of an image pertaining to the brightened image generating process illustrated in FIG. 2.
Figure 3C:
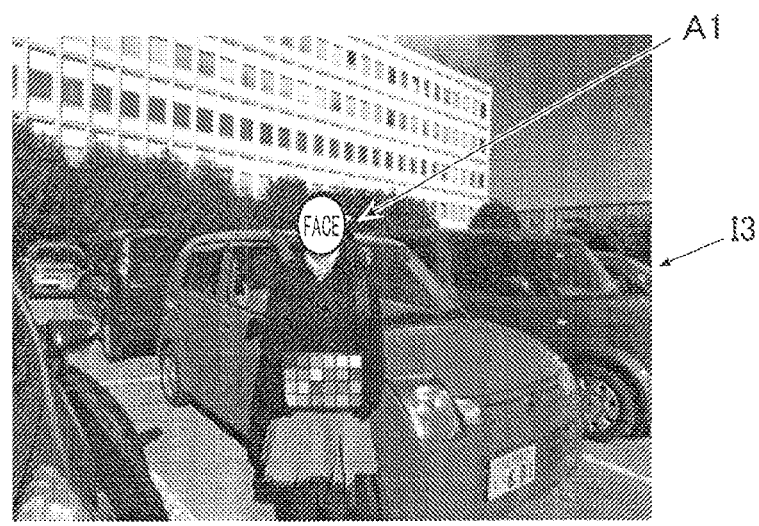
FIG. 3C is a diagram schematically illustrating an example of an image pertaining to the brightened image generating process illustrated in FIG. 2.

The LUTs 21 may include, for example, a standard color LUT for generating standard color images (e.g. an image I2 intended for background (see FIG. 3B) to be described later), and a brightening LUT for generating images (e.g. an image I3 intended for face (see FIG. 3C) to be described later) each including a face area A1 which has been subjected to a brightening process.

Incidentally, the memory 2 may further include, in addition to the abovementioned LUTs 21, a flesh color emphasizing LUT for generating images each including the face area A1 whose flesh color has been emphasized, an azure sky emphasizing LUT for generating images each including an azure sky whose color has been emphasized, and a green emphasizing LUT for generating images each including new green leaves whose colors have been emphasized.

The imaging section 3 images a predetermined object (e.g. a person, etc.) to generate a frame image.

Specifically, the imaging section 3 is equipped with a lens section 31, an electronic imaging section 32, and so on.

The lens section 31 is composed of a plurality of lenses such as a zoom lens and a focus lens.

The electronic imaging section 32 is composed of, for example, an image sensor such as a Charge Coupled Device (CCD) and a Complementary Metal-oxide Semiconductor (CMOS). The electronic imaging section 32 converts an optical image, which has passed through various lenses of the lens section 31, into a two-dimensional image signal.

Incidentally, the imaging section 3 may include, in addition to the lens section 31 and the electronic imaging section 32, a diaphragm (not illustrated) which adjusts an amount of light that passes through the lens section 31.

The imaging control section 4 controls imaging of an object by the imaging section 3. Concretely, though illustration is omitted, the imaging control section 4 is equipped with a timing generator, a driver, and so on. The imaging control section 4 causes the timing generator and the driver to drive the electronic imaging section 32 to perform scanning, and causes the electronic imaging section 32 to convert the optical image, which has passed through the lens section 31, into the two-dimensional image signal in each predetermined period, so that the frame image for one screen is read out at a time from an imaging region of the electronic imaging section 32 to be output to the image processing section 5.

The imaging control section 4 may also perform adjustment controls of conditions for object imaging, such as Auto Focus (AF), Automatic Exposure (AE), and Automatic White Balance (AWB).

The image processing section 5 performs a process to convert analog data of the frame image transferred from the electronic imaging section 32 into digital data, a white balance adjusting process, a color adjusting process, and so on, to generate a luminance signal Y and color difference signals Cb, Cr which have digital values. Specifically, the image processing section 5 includes an image obtaining section 501, a face detecting section 502, a color shade adjusting section 503, a brightness adjusting section 504, an image generation control section 505, a flesh color map generating section 506, a first size changing section 507, a smoothing section 508, a second size changing section 509, a transparency setting section 510 and an image synthesizing section 511.

Each of the sections of the image processing section 5 is composed of, for example, a predetermined logical circuit, but such configuration is a mere example, and the present invention is not limited thereto.

The image obtaining section 501 obtains an image I1. (see FIG. 3A) which is to be a processing target of a brightened image generating process to be described later.

Concretely, the image obtaining section (obtaining member) 501 obtains the image I1, which has been taken by the imaging section 3, as the processing target of the brightened image generating process to be described later. Specifically, the image obtaining section 501 obtains, for example, an image data (RGB data) according to a predetermined color filter array (e.g. Bayer array) of the image I1 which has been output from the electronic imaging section 32 and input to the image obtaining section 501. Here, the image obtaining section (copying member) 501 copies image data which corresponds to the image I3 intended for face, the image I3 constituting a brightened synthetic image I9 (see FIG. 7) synthesized by the image synthesizing section 511, while treating the obtained image data as image data for the image I2 intended for background.

Incidentally, the image obtaining section 501 may acquire YUV data obtained by converting a color space of the image data of the processing target image I1 into a YUV color space. The image obtaining section 501 may also treat the image recorded in a recording medium M as the processing target, and obtain the image data thereof to copy the same.

The face detecting section 502 performs a face detecting process.

Concretely, the face detecting section (detecting member) 502 performs a predetermined face detecting process to the image data of the copied image to be used as the image I3 intended for face, which has been obtained and copied by the image obtaining section 501, to detect the face area A1 including a face from the image. Here, the face detecting section 502 may detect, for example, a flesh color area composed of pixels corresponding to flesh color components, after detection of the face area A1. At that time, the face detecting section 502 may detect the flesh color area after converting pixel values of the face area A1 into a predetermined color space (e.g. HSV color space, etc.).

Incidentally, since the above-described face detecting process has been known, detailed description thereof is omitted here.

The color shade adjusting section 503 adjusts a color shade of the face area A1.

Concretely, the color shade adjusting section (color shade adjusting member) 503 adjusts the color shade of the face area A1 detected by the face detecting section 502. Specifically, the color shade adjusting section 503 executes the white balance adjusting process, the color adjusting process, etc., to the copy of the image data obtained by the image obtaining section 501, to adjust the color shade of the whole of the image including the face area A1.

For example, when the image generation control section 505 generates the image I3 intended for face, the color shade adjusting section 503 reads out, from the memory 2, a white balance gain (e.g. gain amount of R components: −2.5%, gain amount of B components: +5.0%, etc.) for brightening, and amplifies the RGB data for the image I3 intended for face so as to adjust the white balance of the image I3 intended for face. The color shade adjusting section 503 also reads out the brightening LUT from the memory 2, and adjusts the color of each pixel constituting the RGB data for the image I3 intended for face, with the face area A1 as a standard, by using the brightening LUT, to generate the YUV data whose color space has been converted into the YUV color space.

Meanwhile, when the image generation control section 505 generates the image I2 intended for background, the color shade adjusting section 503 reads out the standard color LUT from the memory 2, and adjusts the color of each pixel constituting the RGB data for the image I2 intended for background, by using the standard color LUT, to generate the YUV data whose color space has been converted into the YUV color space. Incidentally, the color shade adjusting section 503 may adjusts the white balance of the RGB data for the image I2 intended for background.

Here, the brightening LUT is set by using the face area A1, especially the flesh color component/components of the face area A1, as a standard. For example, the brightening LUT is set to the conversion value(s) capable of making the flesh color naturally whiter, compared with the standard color LUT.

The brightness adjusting section 504 adjusts a brightness of the face area A1.

Concretely, the brightness adjusting section (brightness adjusting member) 504 adjusts a brightness of the face area A1 detected by the face detecting section 502. Specifically, the brightness adjusting section 504 performs a gamma correction to the copy of the image data obtained by the image obtaining section 501 to adjust the brightness of the whole of the image including the face area A1.

For example, when the image generation control section 505 generates the image I3 intended for face, the brightness adjusting section 504 executes the gamma correction, by using a correction value(s) based on the flesh color area of the face area A1, to each pixel constituting the image data (YUV data) for the image I3 intended for face, so as to adjust the brightness of the whole of the image I3 intended for face.

Meanwhile, when the image generation control section 505 generates the image I2 intended for background, the brightness adjusting section 504 executes the gamma correction, by using a correction value(s) corresponding to the standard color image, to each pixel constituting the image data (YUV data) for the image I2 intended for background, so as to adjust the brightness of the whole of the image I2 intended for background.

Here, the correction value corresponding to the image I3 intended for face is set by using the face area A1, especially the flesh color components of the face area A1, as a standard. For example, the correction value corresponding to the image I3 intended for face is set to a value which makes the pixel values of the flesh color area of the face area A1 whiter (brighter) after correction, compared with the correction value corresponding to the image I2 intended for background.

The image generation control section 505 generates the image I3 intended for face and the image I2 intended for background.

Concretely, the image generation control section 505 causes the color shade adjusting section 503 to amplify the RGB data for the image I3 intended for face by the white balance gain for brightening, and then generate the YUV data in which a color of each pixel constituting the RGB data has been adjusted, with the face area A1 as a standard, by using the brightening LUT. Subsequently, the image generation control section 505 causes the brightness adjusting section 504 to perform the gamma correction to the pixel value of each pixel of the YUV data with a gamma correction value based on the flesh color area of the face area A1 so that the image data of the image I3 intended for face is generated. At that time, the image generation control section 505 causes the brightness adjusting section 504 to adjust the brightness of the whole of the image I3 intended for face, and causes the color shade adjusting section 503 to adjust the color shade of the whole of the image I3 intended for face, so that the flesh color components of the face area A1 obtain more natural brightness.

Thus, the image generation control section 505 corrects, as a correcting member, the flesh color components of the face area A1, which has been detected by the face detecting section 502, so that they become a predetermined status (for example, so that the flesh color components of the face area A1 obtain more natural brightness). Accordingly, the correction is performed so that the brightness and color shade of the whole of the copied image for the image I3 intended for face are adjusted.

The image generation control section 505 also causes the color shade adjusting section 503 to generate the YUV data in which a color of each pixel constituting the RGB data for the image I2 intended for background has been adjusted by using the standard color LUT, and subsequently causes the brightness adjusting section 504 to perform the gamma correction to the pixel value of each pixel of the YUV data by using the gamma correction value corresponding to the standard color image, so that the image data of the image I2 intended for background is generated.

Incidentally, the image generation control section 505 may execute the processing by the brightness adjusting section 504 first, and then execute the processing by the color shade adjusting section 503, in the generating process of the image I3 intended for face and/or the image I2 intended for background.

Figure 5A:
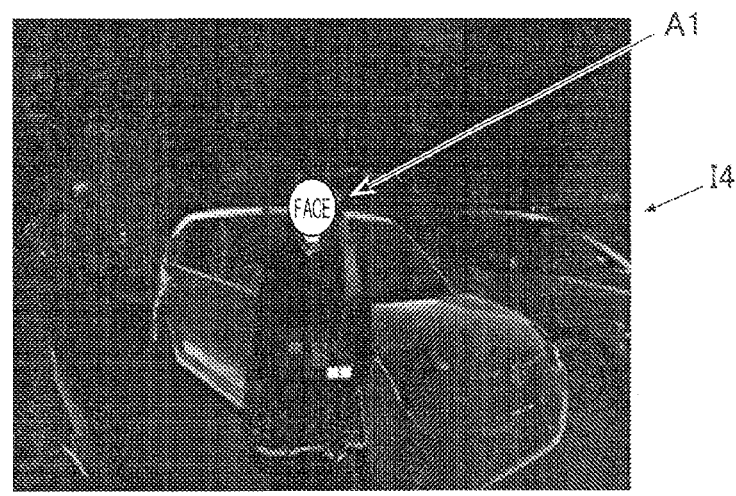
FIG. 5A is a diagram schematically illustrating an examples of an image pertaining to the brightening face map generating process illustrated in FIG. 4.

The flesh color map generating section 506 generates a flesh color map I4 (see FIG. 5A).

Specifically, for example, the flesh color map generating section 506 obtains the copy of the image data of the image I3 intended for face generated by the image generation control section 505, performs a flesh color detecting process to detect the flesh color components from the face area A1, and generates the flesh color map in which the detected flesh color components are represented by gradation of 8 bits [0 to 255].

Incidentally the flesh color detecting process may be performed to the YUV data of the image I3 intended for face, or may be performed to the HSV data obtained by conversion into the HSV color space.

The first size changing section 507 changes a size of the flesh color map I4.

Figure 5B:
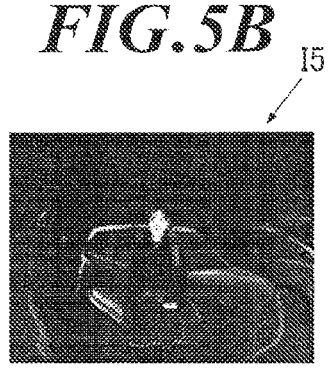
FIG. 5B is a diagram schematically illustrating an examples of an image pertaining to the brightening face map generating process illustrated in FIG. 4.

Concretely, the first size changing section (first size changing member) 507 changes the size of the image (flesh color map I4), which has been generated by correcting the flesh color components of the face area A1 by the image generation control section 505, with the size of the face area A1 as a standard. Specifically, the first size changing section 507 obtains the flesh color map I4 generated by the flesh color map generating section 506, and executes a reducing process to the flesh color map I4 so that the face area A1 in the flesh color map I4 has a predetermined size (e.g. the number of pixels in lengthwise and crosswise directions: 64×64 pixels, etc.), so as to generate a reduced flesh color map I5 (see FIG. 5B) whose size (the number of pixels) in lengthwise and crosswise directions is reduced.

By this, even if the sizes of the face areas A1 in the flesh color maps I4 different from one another, the sizes of the face areas A1 in the reduced flesh color maps I5 become substantially constant.

The smoothing section 508 performs a smoothing process to the reduced flesh color map I5.

Figure 5C:
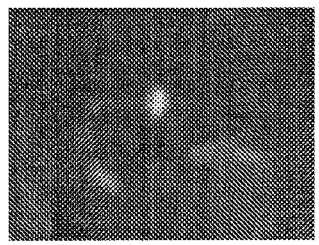
FIG. 5C is a diagram schematically illustrating an examples of an image pertaining to the brightening face map generating process illustrated in FIG. 4.

Concretely, the smoothing section (smoothing member) 508 executes the smoothing process to the reduced flesh color map I5, which has been generated by changing the size thereof by the first size changing section 507. Specifically, the smoothing section 508 obtains the reduced flesh color map I5 generated by the first size changing section 507, and performs filtering using an (epsilon) filter of a predetermined size to the reduced flesh color map I5 so that a smoothed image I6 (see FIG. 5C) is generated.

Because the sizes of the face areas A1 in the reduced flesh color map I5 are substantially constant, the smoothing section 508 may uniformly perform filtering using the s filter having a constant size to all of the reduced flesh color maps I5.

The second size changing section 509 changes a size of the smoothed image I6.

Figure 6A:
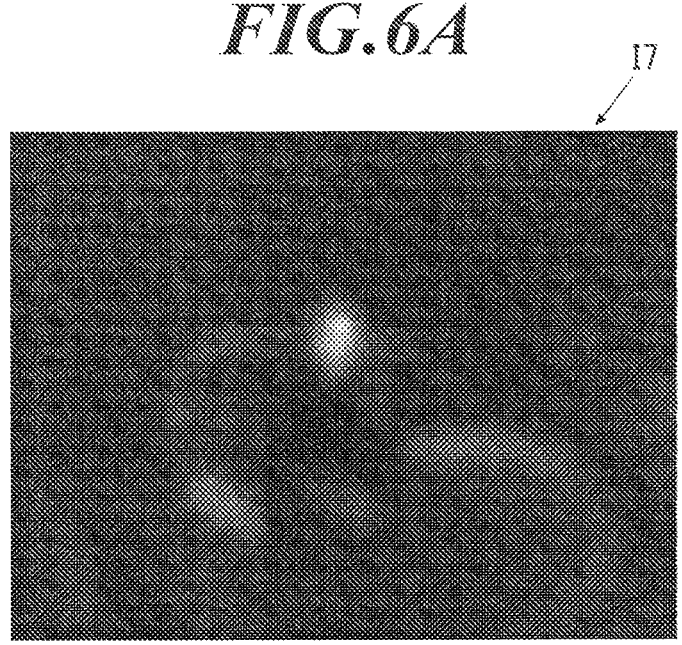
FIG. 6A is a diagram schematically illustrating an example of an image pertaining to the brightening face map generating process illustrated in FIG. 4.

Concretely, the second size changing section (second size changing member) 509 changes the size of the smoothed image I6, to which the smoothing process has been executed by the smoothing section 508, so that it becomes the original size of the corresponding flesh color map I4. Specifically, the second size changing section 509 obtains the smoothed image I6 generated by the smoothing section 508, and performs an enlarging process to the smoothed image I6 so that the size (the number of pixels) in lengthwise and crosswise directions of the smoothed image I6 becomes equal to the size in lengthwise and crosswise directions of the corresponding flesh color map I4, so as to generate an enlarged smoothed image I7 (see FIG. 6A) whose size (number of pixels) in lengthwise and crosswise directions has been enlarged.

The transparency setting section 510 sets a transparency of the face area A1.

Concretely, transparency setting section (setting member) 510 sets the transparency of the face area A1 of the image I3 intended for face, which is to be synthesized on the image I2 intended for background, on the basis of the enlarged smoothed image I7 whose size has been changed by the second size changing section 509. Specifically, the transparency setting section 510 sets the transparency of each pixel of the whole of the image intended for face, the image I3 including the face area A1.

Figure 6B:
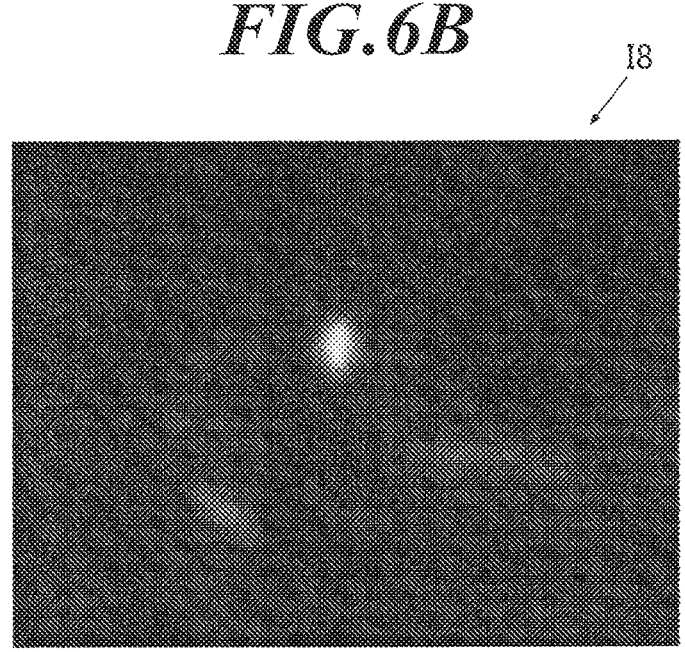
FIG. 6B is a diagram schematically illustrating an example of an image pertaining to the brightening face map generating process illustrated in FIG. 4.

For example, the transparency setting section 510 obtains the enlarged smoothed image I7 generated by the second size changing section 509, adjusts a contrast of the enlarged smoothed image I7, and then executing filtering using the s filter of the predetermined size to generate a brightening face map I8 (see FIG. 6B).

Here, the brightening face map I8 has pixel values each being represented by 8 bits [0 to 255], and the transparencies are set depending on the respective pixel values. In other words, each transparency (pixel value) represents a weight of each pixel of the image I3 intended for face, the image I3 corresponding to the brightening face map I8, when being subjected to alpha blending with the image I2 intended for background. For example, the transparent rate of the pixel having the transparency (pixel value) "255" becomes 0 (zero) % with respect to the image I2 intended for background, and the transparent rate of the pixel having the transparency (pixel value) "0 (zero)" becomes 100% with respect to the image I2 intended for background.

Incidentally, the transparency of the brightening face map I8 may be, for example, a binary value representing whether or not the image I2 intended for background has transparency with respect to the image I3 intended for face.

The image synthesizing section 511 synthesizes the image I3 intended for face and the image I2 intended for background.

Concretely, the image synthesizing section (synthesizing member) 511 makes the transparency of the face area A1 detected by the face detecting section 502 different from the transparencies of other areas (areas other than the face), and synthesizes the image (the image I3 intended for face) corrected by the image generation control section 505 and the image (the image intended for background) obtained by the image obtaining section 501. In other words, the image synthesizing section 511 synthesizes the face area A1 of the image I3 intended for face, whose flesh color components have been corrected, on the image I2 intended for background, by using the transparencies set by the transparency setting section 510.

Figure 7:
FIG. 7 is a diagram schematically illustrating an example of a brightened synthetic image generated by the brightened image generating process illustrated in FIG. 2.

Specifically, the image synthesizing section 511 synthesizes the image I3 intended for face, whose brightness and color shade have been adjusted by the brightness adjusting section 504 and the color shade adjusting section 503, respectively, under the control of the image generation control section 505, on the image I2 intended for background, by using the brightening face map I8 in which the transparencies have been set, so as to generate the image data of the brightened synthetic image I9 (see FIG. 7). For example, as to the pixels of the image I3 intended for face, the image synthesizing section 511 causes the pixel having transparency "0" set in the brightening face map I8 to have transparency with respect to the image I2 intended for background, and causes the pixel having transparency "255" to be overwritten, with the pixel value of the corresponding pixel of the image I3 intended for face, on the pixel of the image I2 intended for background. Moreover, as to the pixels having transparencies "1 to 254", the pixel values of the pixels of the image I3 intended for face are blended with the pixel values of the corresponding pixels of the image I2 intended for background, respectively, depending on their transparencies (alpha blending).

Since the alpha blending is known technique, the detailed description thereof is omitted here.

The recording medium control section 6 is configured so that the recording medium M is attachable/detachable to/from the recording medium control section 6, and controls reading of data from the attached recording medium M and writing of data to the recording medium M.

Incidentally, the recording medium M is composed of a non-volatile memory (flash memory) or the like, but this is a mere example and the present invention is not limited thereto. It can be arbitrarily changed as someone thinks proper.

The display section 7 is equipped with a display panel 71 and a display control section 72.

The display panel 71 displays the image within a display screen. The display panel 71 includes, for example, a liquid crystal display panel and an organic EL display panel, but they are mere examples and the present invention is not limited thereto.

The display control section 72 reads out the image data for display temporarily stored in the memory 2, and performs controlling so that a predetermined image is displayed on the display screen of the display panel 71 on the basis of the image data having a predetermined size which has been decoded by the image processing section 5. Specifically, the display control section 72 includes a Video Random Access Memory (VRAM), a VRAM controller, a digital video encoder, etc., which are not illustrated. The digital video encoder reads out the luminance signal Y and color difference signals Cb, Cr, which have been encoded by the image processing section 5 and stored in the VRAM, from the VRAM through the VRAM controller, at a predetermined reproducing frame rate (e.g. 30 fps), and generates video signals on the basis of these pieces of data to output the video signal to the display panel 71.

The operational input section 8 is used for executing predetermined operations of the imaging apparatus 100. Specifically, the operational input section 8 is equipped with an operation section including a shutter button relating to an instruction to image an object, a selection determining button relating to selection/instruction of an imaging mode, functions, etc., a zoom button relating to adjustment instruction of a zoom amount, which buttons are not illustrated, and so on, and outputs a predetermined operation signal to the central control section 1 depending on the operation in each button of the operation section.

<Brightened Image Generating Process>

Next, the brightened image generating process by the imaging apparatus 100 will be described with reference to FIGS. 2 to 7.

FIG. 2 is a flowchart illustrating an example of an operation relating to the brightened image generating process.

The brightened image generating process is executed by the respective sections of the imaging apparatus 100 under the control of the central control section 1 when a brightened image imaging mode is selected/instructed from among a plurality of operation modes displayed on a menu screen, on the basis of a predetermined operation in the selection determining button of the operation input section 8 by a user.

Incidentally, the brightened image generating process may be executed, for example, to the image recorded in the recording medium M.

As illustrated in FIG. 2, first, the CPU of the central control section 1 outputs an imaging control command to the imaging control section 4, for example, when the imaging instruction is input by a predetermined operation in the shutter button of the operation input section 8 by a user. The imaging control section 4 controls the imaging section 3 to take the image I1 of an object (Step S1).

Then, the image obtaining section 501 of the image processing section 5 obtains the image I1 (see FIG. 3A) taken by the imaging section 3 as a processing target of the brightened image generating process (Step S2). Specifically, for example, the image obtaining section 501 obtains the image data (RGB data), according to the predetermined color filter array (e.g. Bayer array), of the image I1 which has been output from the electronic imaging section 32 and input to the image obtaining section 501, and then sets this data as the image data for the image I2 intended for background. The image obtaining section 501 also copies the image data for the image I3 intended for face.

Subsequently, the image processing section 5 causes the processing to be branched depending on the processing target image (Step S3). Concretely, the image processing section 5 makes the processing shift to Step S4 in the case of the image I2 intended for background (Step S3: for background), and makes the processing shift to Step S51 in the case of the image I3 intended for face (Step S3: for face).

<Image Intended for Background>

In Step S4, the image generation control section 505 causes the color shade adjusting section 503 to adjust the color of each pixel constituting the RGB data for the image I2 intended for background by using the standard color LUT read out from the memory 2 so as to generate the YUV data, and causes the brightness adjusting section 504 to perform the gamma correction of the pixel value of each pixel of the YUV data by using the gamma correction value corresponding to the standard color image. Thus, the image generation control section 505 generates the image data of the image I2 (see FIG. 3) intended for background (Step S4).

<Image Intended for Face>

In Step S51, the face detecting section 502 executes the predetermined face detecting process to the image data of the image I3 intended for face to detect the face area A1 including the face, from the image (Step S51).

Subsequently, the image generation control section 505 causes the color shade adjusting section 503 to amplify the RGB data for the image I3 intended for face by using the brightening white balance gain, and then adjust the color of each pixel constituting the RGB data, with the face area A1 as a standard, by using the brightening LUT read out from the memory 2, so as to generate the YUV data. Then, the image generation control section 505 causes the brightness adjusting section 504 to perform the gamma correction of the pixel value of each pixel of the YUV data by using the gamma correction value based on the flesh color area of the face area A1. Thus, the image generation control section 505 generates the image data of the image I3 (see FIG. 3C) intended for face (Step S52).

Next, the image processing section 5 executes the brightening face map generating process (see FIG. 4) (Step S53).

Figure 4:
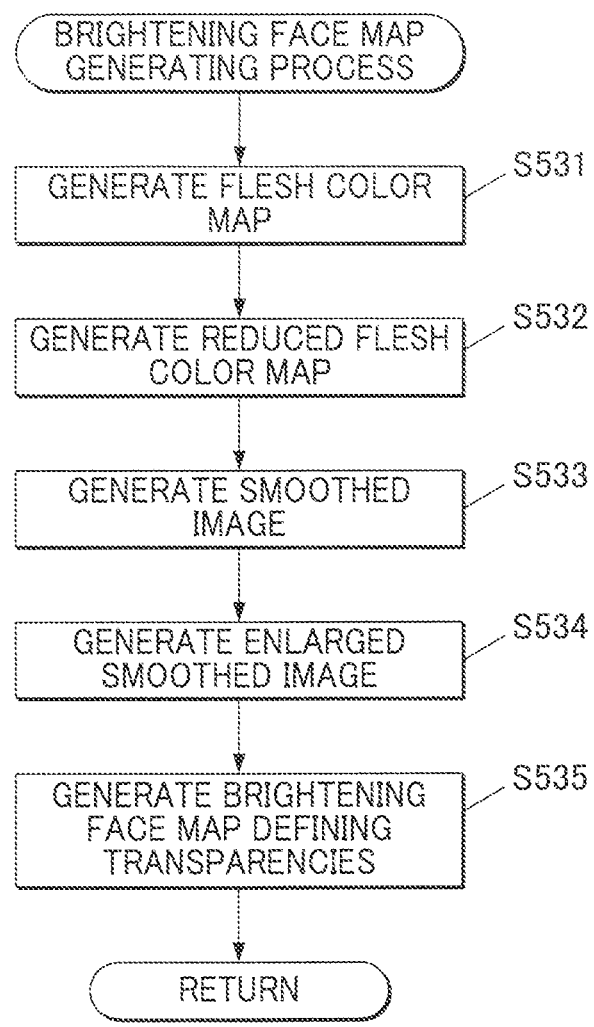
FIG. 4 is a flowchart illustrating an example of an operation of a brightening face map generating process in the brightened image generating process illustrated in FIG. 2.

The brightening face map generating process will be described below with reference to FIG. 4. FIG. 4 is a flowchart illustrating an example of an operation of the brightening face map generating process.

As illustrated in FIG. 4, first, the flesh color map generating section 506 generates/obtains the copy of the image data of the image I3 intended for face, and executes the flesh color detecting process to detect the flesh color components from the face area A1 of the image intended for face, and thus the flesh color map I4 (see FIG. 5A) is generated (Step S531).

Next, the first size changing section 507 performs the reducing process to the flesh color map I4 so that the face area A1 within the generated flesh color map I4 has a predetermined size (e.g. the number of pixels in lengthwise and crosswise directions: 64×64 pixels, etc.) so as to generate the reduced flesh color map I5 (see FIG. 5B) (Step S532). Subsequently, the smoothing section 508 performs filtering using the 6 filter of the predetermined size to the generated reduced flesh color map I5 to generate the smoothed image I6 (see FIG. 5C) (Step S533).

Next, the second size changing section 509 executes the enlarging process to the smoothed image I6 so that the size in lengthwise and crosswise directions of the generated smoothed image I6 becomes the original size in lengthwise and crosswise directions of the corresponding flesh color map I4, so as to generate the enlarged smoothed image I7 (see FIG. 6A) (Step S534).

Subsequently, the transparency setting section 510 adjusts the contrast of the enlarged smoothed image I7 which has been generated, and then executing filtering using the $\epsilon p0$ filter of the predetermined size so as to generate the brightening face map I8 (see FIG. 6B) in which the transparencies are set with the pixel values represented by the gradation of 8 bits [0 to 255] (Step S535).

Thus, the brightening face map generating process ends.

Returning to FIG. 2, the image synthesizing section 511 synthesizes the image I3 intended for face generated by the image generation control section 505 on the image I2 intended for background, by using the brightening face map I8 generated by the transparency setting section 510, so that the image data of the brightened synthetic image (see FIG. 7) is generated (Step S6). Specifically, the image synthesizing section 511 synthesizes the image intended for face and the image I2 intended for background, by alpha blending, with the transparency set in the brightening face map I8 as a standard, so as to generate the image data of the brightened synthetic image I9.

After that, the recording medium control section 6 obtains the image data of the brightened synthetic image I9 from the image processing section 5 to store the image data in a predetermined storage region in the recording medium M (Step S7), and terminates the brightened image generating process.

As described above, the imaging apparatus 100 of the embodiment adjusts not only the brightness of the face area A1 detected from the processing target image I1 (e.g. imaged image, etc.), but also the color shade of the face area A1, so as to correct the flesh color components of the face area A1. Thus, compared with the case of adjusting only the brightness within the luminance range corresponding to the flesh color area of the face area A1, correction can be performed so that the flesh color components of the face area A1 obtains more natural brightness, and accordingly the brightness of the face can be properly expressed.

Moreover, the imaging apparatus 100 synthesizes the image I3 intended for face and the image I2 intended for background while making the transparency of the face area A1, whose flesh color components have been corrected, different from the transparencies of other areas. Thus, most appropriate image processing can be performed to each of the face area A1 and the area other than the face area A1. Specifically, it is possible to adjust the brightness of the whole of the image I3 intended for face including the face area A1, and adjust the color shade of the whole of the image I3 intended for face, by using the detected face area A1 as a standard, to synthesize the image I3 intended for face including the face area A1, whose flesh color components have been corrected, on the image I2 intended for background, by using the set transparencies of the whole image.

Thus, the brightness of the face in the brightened synthetic image I9 can be properly expressed. For example, also in the case of the brightened synthetic image I9 obtained by imaging a person with the scenery in the background, the background portion can be prevented from becoming whitish according to the effect of the face which has been adjusted to be brighter. The brightness of the face can therefore be properly expressed while reducing the influence on the background portion.

Thus, the face area A1 can be appropriately corrected while reducing the influence on the area other than the face area A1.

Moreover, the imaging apparatus 100 changes the size of the image I3 intended for face (the flesh color map I4) including the face area A1 whose flesh color components have been corrected, by using the size of the face area A1 as a standard, and executes the smoothing process to the image (the reduced flesh color map I5) whose size has been changed. Accordingly, even in the case that the size of the face area A1 in the flesh color map I4 is different from the size of the face area A1 in another flesh color map I4, by changing the size of each face area A1 to the predetermined size, the sizes of the face areas A1 in the reduced flesh color map I5 become substantially constant. Thus, the contents of subsequent processing in the smoothing process can be substantially standardized.

Furthermore, because the transparency of the face area A1 is set on the basis of the image (the enlarged smoothed image I7) obtained by changing the size of the image, to which the smoothing process has been executed, so that it becomes the original size of the image I3 intended for face (the flesh map I4) including the corresponding face area A1, the transparency of the face area A1 and the transparencies of the areas other than the face area A1 can be properly set. Especially, because the smoothing process is executed to the flesh color map I4 to generate the brightening face map I8 in which the transparencies have been set, compared with the case of directly using the flesh color map I4, the area of color similar to the flesh color is unlikely become uneven in the brightened synthetic image I9. Thus, the brightened synthetic image I9 having more natural appearance can be generated.

Incidentally, the present invention is not limited to the above embodiments, and various modifications and design changes can be added thereto without departing from the spirit of the present invention.

For example, though the image I3 intended for face and the image I2 intended for background are synthesized in order to correct the flesh color components of the face area A1 in the above embodiment, this method is a mere example and the present invention is not limited thereto. The method can be appropriately changed as someone thinks proper as long as the method can correct the flesh color components of the face area A1. Moreover, though the above embodiment adjusts the brightness and color shade of the whole of the image I3 when creating the image I3 intended for face, for example, it is also possible to adjust the brightness and color shade of only the face area A1, which is a portion to be synthesized on the image I2 intended for background.

The above embodiment adjusts the brightness and color shade of the face area A1 to perform the brightening process, but it is a mere example and the present invention is not limited thereto. For example, the brightness and color shade of the face area A1 may be adjusted in order to express more natural blackness (e.g. tanning, etc.).

Moreover, the above embodiment uses the lookup tables 21 to adjust the color shade of the face area A1, but it is a mere example and the present invention is not limited thereto. For example, it is also possible to perform calculation according to a predetermined arithmetic expression.

The configuration of the imaging apparatus 100 described in the above embodiment is a mere example, and the present invention is not limited thereto. For example, it is also possible to obtain the image, which has been taken by an external imaging member, to correct the flesh color components of the face area A1. Moreover, the detecting member (the face detecting section 502) may detect the face area not only from the image copied by the copying member (the image obtaining section 501), but also from the image obtained by the obtaining member (the image obtaining section 501). The detecting member may also detect the face area from two images obtained by continuous shooting.

Additionally, the above embodiment describes the configuration where the functions as the obtaining member, the copying member, the detecting member, the correcting member and the synthesizing member are implemented by driving the image obtaining section 501, the face detecting section 502, the image, generation control section 505 and the image synthesizing section 511 under the control of the CPU of the central control section 1, but the present invention is not limited thereto. The above functions may be implemented by executing the predetermined programs or the like by the central control section 1.

Concretely, it is possible to cause a program memory (not illustrated) storing the programs to previously store programs including an obtaining process routine, a copying process routine, a detecting process routine, a correcting process routine and a synthesizing process routine. The CPU of the central control section 1 may function as a member to obtain the image according to the obtaining process routine. The CPU of the central control section 1 may function also as a member to copy the obtained image according to the copying process routine. The CPU of the central control section 1 may function also as a member to detect the face area A1 from the copied image according to the detecting process routine. The CPU of the central control section 1 may function also as a member to perform correction to adjust the brightness and color shade of the whole of the copied image so that the flesh color components of the detected face area A1 becomes a predetermined status according to the correcting process routine. The CPU of the central control section 1 may function also as a member to make the transparency of the detected face area A1 different from the transparencies of other areas and synthesize the corrected image and the obtained image according to the synthesizing process routine.

Similarly, also the first changing member, the smoothing member, the second changing member and the setting member can be implemented by executing the predetermined programs by the CPU of the central control section 1.

Moreover, as a computer readable medium storing programs for executing the above processes, there can be used a ROM, a hard disk, a non-volatile memory such as a flash memory and a portable recording medium such as a CD-ROM. As a medium for providing data of the programs via a predetermined communication line, also carrier wave can be adopted.

Although some embodiments of the present invention are described above, the scope of the present invention is not limited to the above embodiment and includes the scope of the invention of the claims and the scope of equivalents thereof.

What is claimed is:

1. An image processing apparatus comprising:
    a CPU which detects an imaging instruction and which functions as:
        an obtaining member to obtain an image;
        a detecting member to detect a face area from the image obtained by the obtaining member;
        a correcting member to perform correction to adjust a brightness and a color shade of a whole of the image from which the face area is detected by the detecting member so that a flesh color component of the face area detected by the detecting member is corrected to become a predetermined status;
        a generating member to perform correction to a brightness and a color shade of a whole of the image obtained by the obtaining member so that an image different from the image corrected by the correcting member is generated; and
    a synthesizing member to make a transparency of the face area detected by the detecting member different from a transparency of another area and to synthesize the image corrected by the correcting member and the image generated by the generating member.

2. The image processing apparatus according to claim 1, wherein the CPU further functions as:
    a first changing member to change a size of the image including the face area in which the flesh color component has been corrected by the correcting member, by using a size of the face area as a standard;
    a smoothing member to perform a smoothing process to the image whose size has been changed by the first changing member;
    a second changing member to change the size of the image, to which the smoothing process has been performed by the smoothing member, so that the changed size becomes the original size of the image including the corresponding face area; and
    a setting member to set the transparency of the face area based on the image whose size has been changed by the second changing member.

3. The image processing apparatus according to claim 2, wherein the first changing member changes the size of the image including the face area in which the flesh color component has been corrected by the correcting member so that the face area has a predetermined size.

4. The image processing apparatus according to claim 1, wherein the correcting member performs the correction to adjust the brightness and the color shade of the whole of the image so that the flesh color component of the face area detected by the detecting member obtains natural brightness.

5. The image processing apparatus according to claim 1, further comprising:
    an imaging member,
    wherein the obtaining member obtains the image which has been imaged by the imaging member in response to the CPU detecting the imaging instruction.

6. The image processing apparatus according to claim 1, wherein the synthesizing member synthesizes the image corrected by the correcting member and the image generated by the generating member by making the transparency of the face area detected by the detecting member different from the transparency of the another area such that an influence of the face area detected by the detecting member on the another area is reduced.

7. An image processing method using an image processing apparatus, the method comprising:

obtaining an image in response to detection of an imaging instruction;

detecting a face area from the image obtained by the obtaining;

performing a first correction to adjust a brightness and a color shade of a whole of the image from which the face area is detected by the detecting so that a flesh color component of the face area detected by the detecting is corrected to become a predetermined status;

generating, by performing a second correction to adjust a brightness and a color shade of a whole of the image obtained by the obtaining, an image different from the image corrected by performing the first correction;

making a transparency of the face area detected by the detecting different from a transparency of another area and synthesizing the image corrected by performing the first correction and the image generated by the generating.

8. A non-transitory computer readable recording medium having a program recorded thereon which is executable to control a computer of an image processing apparatus to function as:

an obtaining member to obtain an image when an instruction to image is detected;

a detecting member to detect a face area from the image obtained by the obtaining member;

a correcting member to perform correction to adjust a brightness and a color shade of a whole of the image from which the face area is detected by the detecting member so that a flesh color component of the face area detected by the detecting member is corrected to become a predetermined status;

a generating member to perform correction to a brightness and a color shade of a whole of the image obtained by the obtaining member so that an image different from the image corrected by the correcting member is generated; and a synthesizing member to make a transparency of the face area detected by the detecting member different from another area and to synthesize the image corrected by the correcting member and the image generated by the generating member.

* * * * *